United States Patent [19]
Yoneyama et al.

[11] Patent Number: 5,256,952
[45] Date of Patent: Oct. 26, 1993

[54] MAGNETIC BEARING CONTROL METHOD AND APPARATUS

[75] Inventors: Mitsuho Yoneyama; Osami Matsushita; Naohiko Takahashi, all of Ibaraki; Yasuo Fukushima, Tsuchiura, all of Japan

[73] Assignee: Hitachi, Ltd., Tokyo, Japan

[21] Appl. No.: 889,997

[22] Filed: May 29, 1992

[30] Foreign Application Priority Data

May 31, 1991 [JP] Japan .................. 3-157914

[51] Int. Cl.⁵ .................. H02K 7/09; F16C 32/04
[52] U.S. Cl. .................. 318/629; 318/623; 318/632; 310/90.5; 384/133
[58] Field of Search .............. 318/611, 623, 629, 448, 318/460, 114, 128, 605, 607, 625, 632, 649, 651, 661; 310/51, 90.5; 384/133, 114, 448; 73/660; 364/576

[56] References Cited

U.S. PATENT DOCUMENTS 4,128,795 12/1978 Habermann et al. .
4,626,754 12/1986 Habermann et al. .......... 310/90.5 X
4,806,835 2/1989 Habermann .................. 318/607
4,827,169 5/1989 Habermann .................. 310/90.5
4,963,804 10/1990 Geiger .................. 318/460
4,992,714 2/1991 Matsushita et al. .
4,999,534 3/1991 Andrianos .................. 310/90.5

FOREIGN PATENT DOCUMENTS 52-93853 8/1977 Japan .
2-227701 9/1990 Japan .
2-244205 9/1990 Japan .

OTHER PUBLICATIONS

"How to use FET" Electronic, Series 91, pp. 132–133, Sanpo Shuppan published, Feb. 1982.

Primary Examiner—Bentsu Ro
Attorney, Agent, or Firm—Evenson, McKeown, Edwards & Lenahan

[57] ABSTRACT

A control method and apparatus for suppressing the vibration components of a magnetic bearing. According to this invention, a vibration wave is sampled at pulses synchronized with the rotation of a rotor, the vibration waveform sampled values at each revolution are averaged, and only the frequency components synchronized with the rotation frequency of the rotor are extracted from the vibration waveform. In addition, the extracted components are subjected to Fourier transform, processed in a frequency region and subjected to Fourier reverse transform. The sequence of these signal processes produces a signal, and the vibration components are suppressed by this signal.

10 Claims, 6 Drawing Sheets

SAMPLING PERIOD

SAMPLING PERIOD

MAGNETIC BEARING CONTROL METHOD AND APPARATUS

BACKGROUND OF THE INVENTION

This invention relates to a control apparatus for controlling a rotor supported by a magnetic bearing to be stable up to high speed rotation, and particularly to a magnetic bearing control method and apparatus suitable for use in processing the amount of feedback in a frequency region in order that the rotor can be controlled to undergo a damping effect up to a high speed region.

In the magnetic bearing, it is difficult to make the axis of inertia of the rotor completely coincident with a predetermined axis set in the bearing. In general, the rotor has a natural frequency dependent on the shape and material of the rotor. Thus, upon rotation the rotor has a dangerous speed at which the vibration of the shaft increases. If the bearing has no damping effect, the vibration increases at the dangerous speed, so that the rotor cannot rotate. So far, in order to prevent this shaft vibration, a control apparatus has been used which detects the positional deviation of the rotating shaft from a predetermined axis, and controls the current in the electromagnetic coil for the magnetic bearing so that this deviation is suppressed, or that the damping effect can be brought about. Since the vibration of the rotor shaft has great energy in the frequency components synchronized with the rotation frequency of the rotor, the control system should greatly suppress only the vibration at such frequencies. Therefore, the control apparatus disclosed in Japanese Patent Laid-open Gazette No. 52-93853 includes a filter of analog circuits for tuning to the frequency equal to the rotation speed of the rotor so that the phase-controlled signal is supplied to the servo circuit, making great damping to the vibration frequencies. Thus, a complicated circuit is used which is formed of a differentiator, an integrator, an adder and so on.

The value of the detected deviation of the rotating shaft is subjected to Fourier transform in real time, to a signal processing in a vibration control law which is a frequency region and to reverse Fourier transform so as to produce a control signal. This control signal is used to control the current in the electromagnetic coil. Thus, an arbitrary control characteristic can be achieved with ease and satisfaction. The frequency analyzer(-hereinafter, abbreviated "FFT analyzer") using the principle of discrete Fourier transform (hereinafter, abbreviated "DFT") will be described briefly with reference to FIGS. 1 and 2.

As shown in FIG. 1, an input waveform x(t) is sampled at each specified sampling period $\Delta t$, and N samples are sequentially stored in a memory (N=8). This storing process is shown at step 401 of the flowchart shown in FIG. 2. The stored values are, as illustrated, x0, x1, ... x7. At step 402, complex amplitude values $A_k$, k=0-7 are found from the formula of DFT given by $$A_k = 8^{-\frac{1}{2}} \sum_{n=0}^{7} xn \cdot \exp(-nj\omega_k), \, k = 0-7 \quad (1)$$

In this equation, j is the imaginary unit, and the following equation is given.

$$vi = \sum_{k=0}^{N-1} N^{-\frac{1}{2}} B_k \exp(ij\omega_k) \quad (2)$$

where $\omega_k = 2\pi k/8$, k=0-7

The complex amplitude values $A_k$ at each frequency $\omega_k$ show that the larger the values, the greater the vibration at the frequency. At step 403, the absolute value of the calculated result $A_k$ (k=0-7) is displayed as a bar graph.

The FFT analyzer fast executes a sequence of operations of data storing→DFT processing→displaying indicated at steps 401 to 403 in FIG. 2. The timing of this sequence of operations is shown in FIG. 1. N (N=8) samples are stored at each sampling period T=(N-1)$\Delta t$ of the input vibration waveform, and then the calculation of DFT and displaying are performed. During the calculation and displaying the data is stopped from being stored. Therefore, DFT calculation is not made over all the interval of the input waveform, and thus a certain interval of the vibration waveform is inevitably overlooked. This DFT calculation is based on the fact that the values of stored data $x_1 \sim x_7$ are a periodical function which is periodically repeated even out of the sampling period T. Therefore, in practice the input waveform is normally multiplied by the window function for picking up the waveform only during the sampling interval before the sampling operation.

The algorithm for the complex amplitude values. Ak of the equation (1) is a very-high speed one called the butterfly computation. As described above, the actual Fourier transform device is constructed to have various functions for its purpose. A conventional example thereof is disclosed in, for example, Japanese Patent Laid-open Gazette No. 61-196370.

The main object of the above common FFT analyzer is to display and monitor the result of having analyzed the frequencies of the vibration waveform even during the data reading stop period. The FFT analyzer is widely used because very useful information for analyzing the source of an abnormal vibration can be obtained by monitoring the complex amplitude values of the frequency components displayed as the output so as to detect the abnormal vibration. However, when it is used as the controller, the presence of the pause period prevents sufficient control. The formula of calculation for the DFT processing and finding the complex amplitude at each operation of reading the waveform data without pause period is described in, for example, "HOW TO USE FFT" written by Ankyo Intake and Masayuki Nakashima, pp.132 to 133 in Electronics science series 91 published by Sanpo shuppan, February, 1982. That is, as shown in FIG. 3, the sample values $x_1$ to $x_7$ at time points 0 to 7 (N=7) on the input waveform x(t) are read and stored in a memory and the complex amplitude values $A_k$, k=0 to 7 are calculated. Then, when the value x8 at time point 8 on the input waveform x(t) is sampled, the oldest data $x_{out}$ x0 is discarded, the stored samples of data each are shifted left within the memory, and the read sample $x_{in}=x_8$ is stored in the rightmost vacancy of the memory. The complex amplitude $A_k$ at this time is given by $$A_{k1} = (A_{k0} + (x_{in} - x_{out})/N^{-\frac{1}{2}}) \exp(j\omega_k), \, K=0-7 \quad (3)$$

This equation can be easily derived. According to the equation (3), if the complex amplitude values $A_{k0}$, k=0 to 7 previously sampled are held, these complex amplitude values $A_{k1}$, k=0 to 7 can be obtained by making once each of the addition, subtraction, multiplication and division of complex numbers for each k. This equation, as compared with the equation (1), is executed in much less time in real time with ease.

According to the DFT algorithm in the FFT analyzer, if the regions other than the sampling interval of the input waveform are a periodical function and coincide in its period with the sampling period of the input waveform as shown in FIG. 4A, the input waveform is subjected to Fourier transform, and the obtained complex amplitude values are shifted in phase ahead by with 90 degrees, and subjected to reverse Fourier transform so as to be a real-time waveform. Thus, at this time the waveform (which occurs during the sampling pause period) with 90 degrees ahead of the input waveform can be known. However, when as shown in FIG. 4B the period of the periodical function does not coincide with the sampling period, the above waveform cannot be obtained. In addition, if the input wave is shifted from the periodical function, correct processing cannot be performed. The control apparatus for the magnetic bearing using the DFT algorithm without the pause period is also not realized yet.

SUMMARY OF THE INVENTION

Accordingly, it is an object of the invention to provide a magnetic bearing control method and apparatus using Fourier transform which can effectively suppress the vibration synchronized with the rotation speed of a rotor even when the vibration of the rotor rotating shaft is not a complete periodic function.

According to this invention, there is provided a magnetic bearing control method having the steps of sampling a vibration waveform at pulses which are synchronized with the rotation of a rotor, averaging vibration waveform values at each revolution, extracting only the frequency components synchronized with the rotation frequency of the rotor from the vibration waveform, subjecting the extracted components to Fourier transform, processing the frequency regions of the Fourier-transformed components, subjecting the processed components to Fourier reverse transform, and controlling a magnetic bearing by a signal obtained by a sequence of the signal processes given above so that vibration components can be suppressed.

According to another aspect of the invention, there is provided a magnetic bearing control method having the steps of generating N sampling pulses of first to N-th pulse (N is an integer) at each revolution of a rotor on a magnetic bearing, detecting deviations of a rotating shaft of the rotor from predetermined positions in two directions within a plane perpendicular to the shaft, sampling the detected deviations in two directions by the first to N th sampling pulses to produce first to N th sampled values, averaging the i-th sampled values obtained after start of operation so as to produce an i th average value each time the i-th sampled values ($i=1-N$) in two directions are produced, obtaining i-th average values up to that time point from the i-th average value, obtaining complex amplitude values by discrete Fourier transform of the first to N-th average values in two directions and calculating a control signal by discrete Fourier reverse transform of the complex amplitude values after signal processing, and controlling the shaft of the rotor on a magnetic bearing by the control signal.

According to this invention, there is further provided a magnetic bearing control apparatus having pulse generating means for generating N sampling pulses of first to N-th sampling pulses (N is an integer) at each revolution of a rotor on a magnetic bearing, detection means for detecting deviations of a rotating shaft of the rotor from predetermined positions in two directions within a plane perpendicular to the shaft, sampling means for producing first to N sampled values by sampling the detected deviations in two directions at the first to N-th sampling pulses, averaging means for obtaining an i-th average value from the i-th average values of the i-th sampled values produced after start of operation up to that time point each time the i-th sampled values ($i=1N$) in two directions are produced from the sampling means, signal processing means for obtaining complex amplitude values by discrete Fourier transform of the first to N th average values in two directions obtained by the averaging means and for calculating a control signal by discrete Fourier reverse transform of the complex amplitude values after signal processing, and control means for controlling the rotating shaft of the rotor on the magnetic bearing by the control signal.

Since the vibration waveform is sampled at pulses synchronized with the rotation of the rotor and since the sampled waveform values at each revolution of the rotor are averaged by the averaging means, only the frequency components synchronized with the rotation frequency of the rotor are extracted from the vibration waveform. Since the components are main components of the deviations of the rotor, the magnetic bearing is controlled so that these deviations can be suppressed by the signal processing of the frequency region into which they are subjected to Fourier transform. Thus, desired control can be realized. In addition, since this Fourier transform processing can be performed at a high speed, the real time processing becomes easy.

DESCRIPTION OF THE PREFERRED EMBODIMENT

Figure 1:
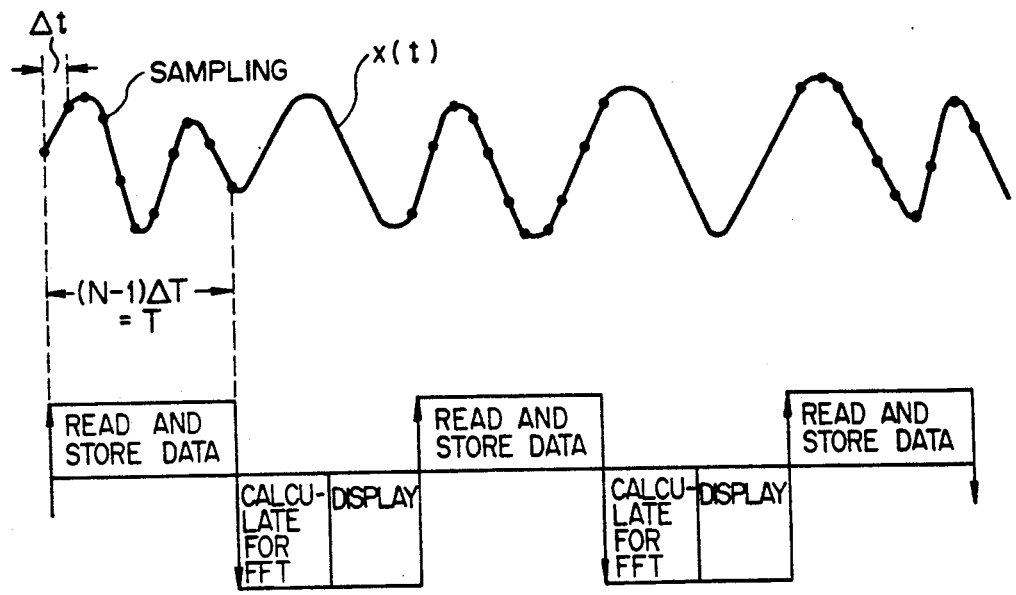
FIG. 1 is a timing chart showing the operation of a conventional FFT analyzer.
Figure 3:
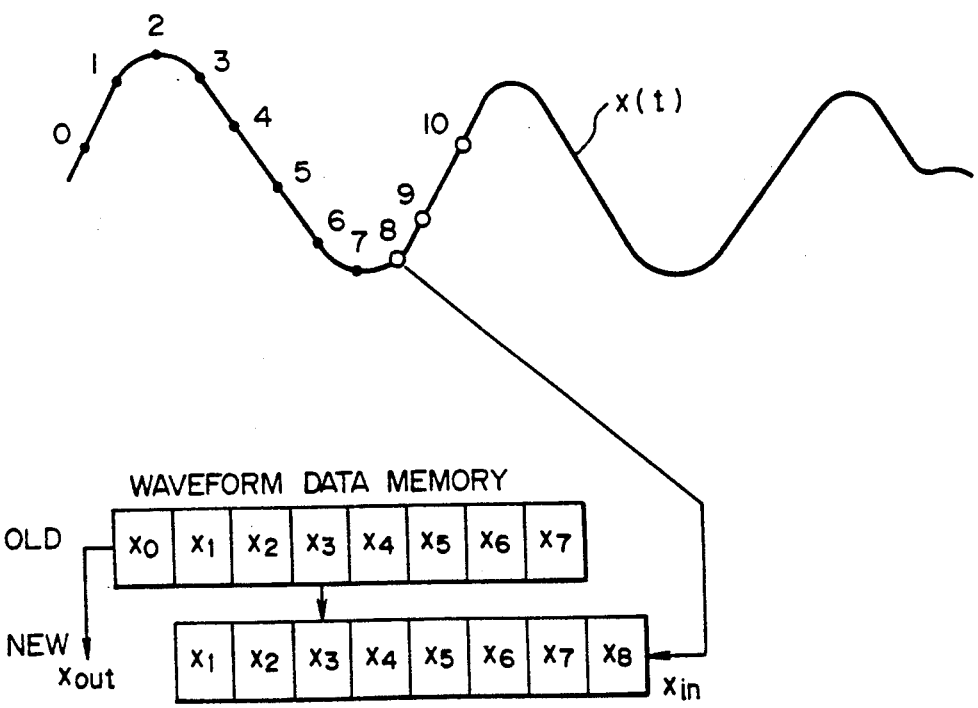
FIG. 3 is a diagram useful for explaining the continuous Fourier transform processing in another conventional example.
Figure 2:
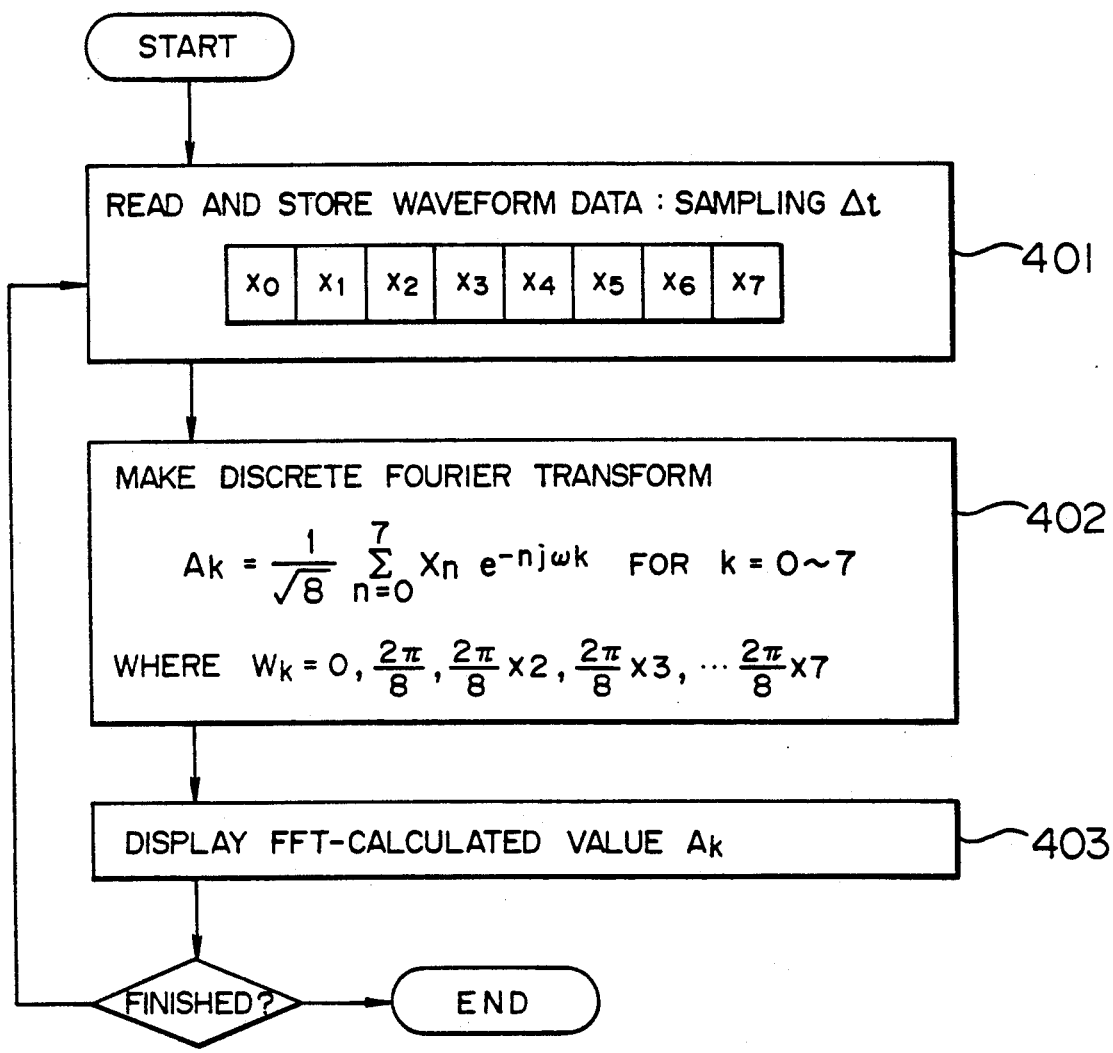
FIG. 2 is a flowchart for the Fourier transform processing in the FFT analyzer shown in FIG. 1.
Figure 4A:
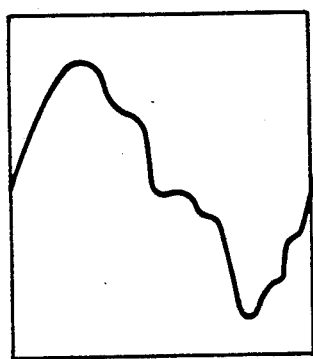
FIGS. 4A and 4B are diagrams showing the relations between the period of the periodic function and the sampling period.
Figure 4A:
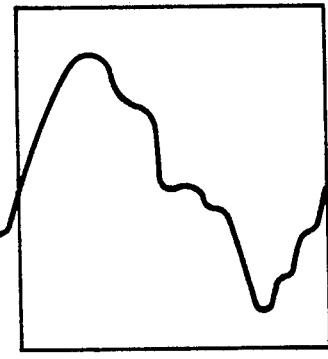
Figure 4B:
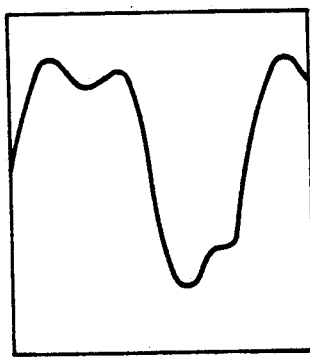
Figure 4B:
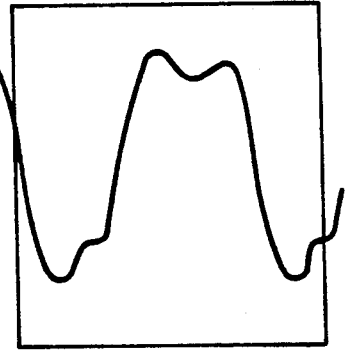
Figure 5:
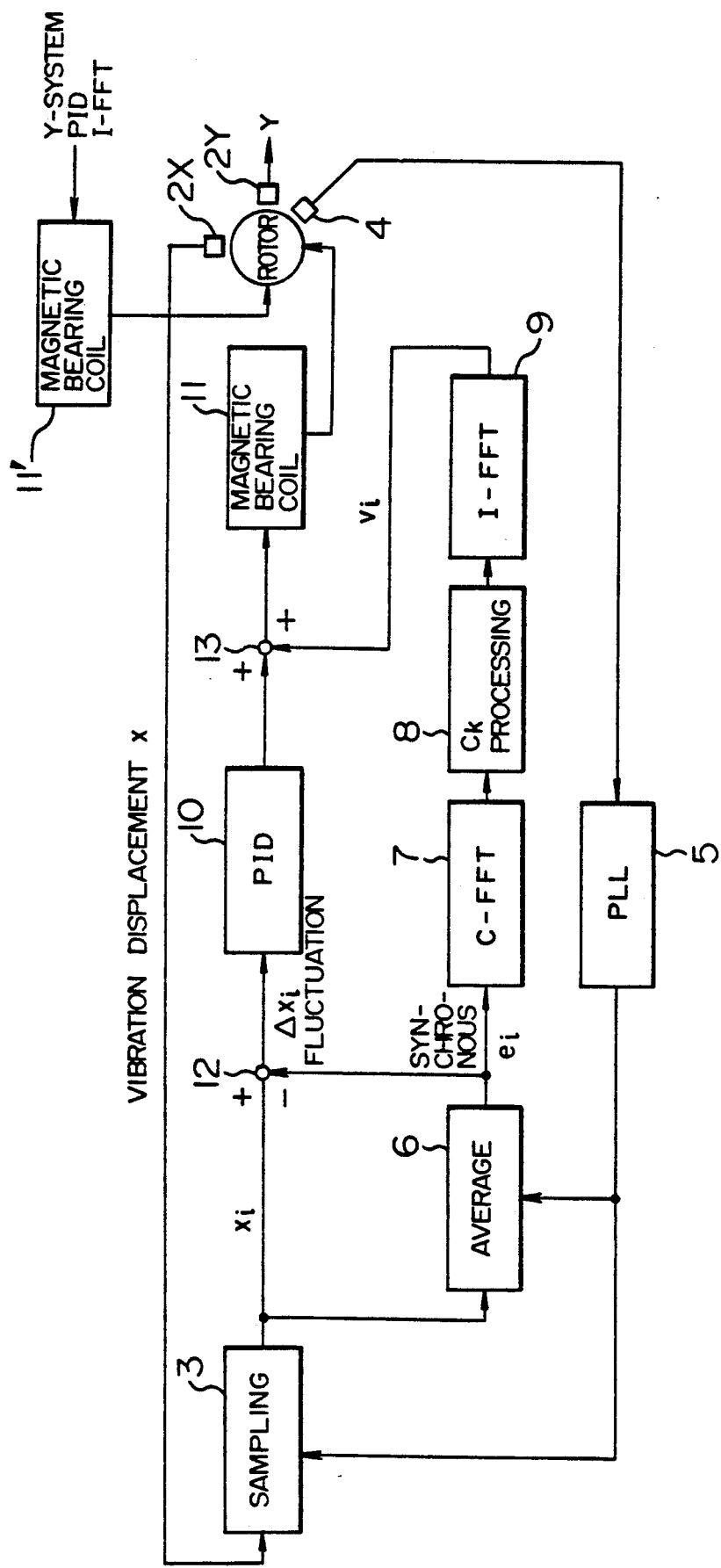
FIG. 5 is a block diagram of one embodiment of a control apparatus of the invention.

One embodiment of the invention will be described with reference to FIGS. 5 and 6. FIG. 5 is a block diagram of one embodiment of a control apparatus of the invention. The vibration displacement x in a vertical plane, of the rotating shaft of a rotor 1 on a magnetic bearing is detected by a position detector 2X and sampled by a sampling circuit 3. At this time, the sampling trigger pulses are N pulses per revolution which are produced from a PLL circuit 5 to which the output from a detector 4 is supplied after detecting the rotation of the rotor 1. The PLL circuit 5 and the detector 4 may be replaced by a pulse encoder which produces N pulses per revolution. The sampled values are supplied to an average processing circuit 6. The vibration of the rotating shaft of the rotor is two-dimensionally caused in a vertical plane relative to the rotating shaft. The control system shown in FIG. 1 is only for one-axis component. In practice, another control system is required for the output y from a position detector 2Y for detecting the component perpendicular to the vibration displacement X.

The average processing circuit 6 receives the sampled values $X_i$ from the sampling circuit 3 and the N pulses from the PLL circuit 5 and produces an average value $e_i$ of the sampled values per revolution of the rotor 1. This output is subjected to Fourier transform by a Fourier transform circuit 7. The Fourier transform output is subjected to $C_k$ processing by a signal processing circuit 8. The sampled values, $V_i$ in time regions from a Fourier reverse transform circuit 9 are supplied to an adder 13.

The average value $e_i$ is also subtracted from the sampled values $X_i$ by a subtracter 12, and the fluctuation, or vibration portion $\Delta x_i$ from the subtracter is supplied to a PID processing circuit 10. The PID processed output is supplied to the adder 13 where it is added to the sampled value $V_i$. The added output is supplied to an X-direction magnetic bearing coil 11. The same signal processing is made for the vibration displacement Y detected by the position detector 2Y. The Y-processed output is supplied to a magnetic bearing coil 11', though not shown because the signal processing is exactly the same as that for X direction.

The important circuit elements of the embodiment after the average processing circuit 6 inclusive will be described in detail.

Figure 6:
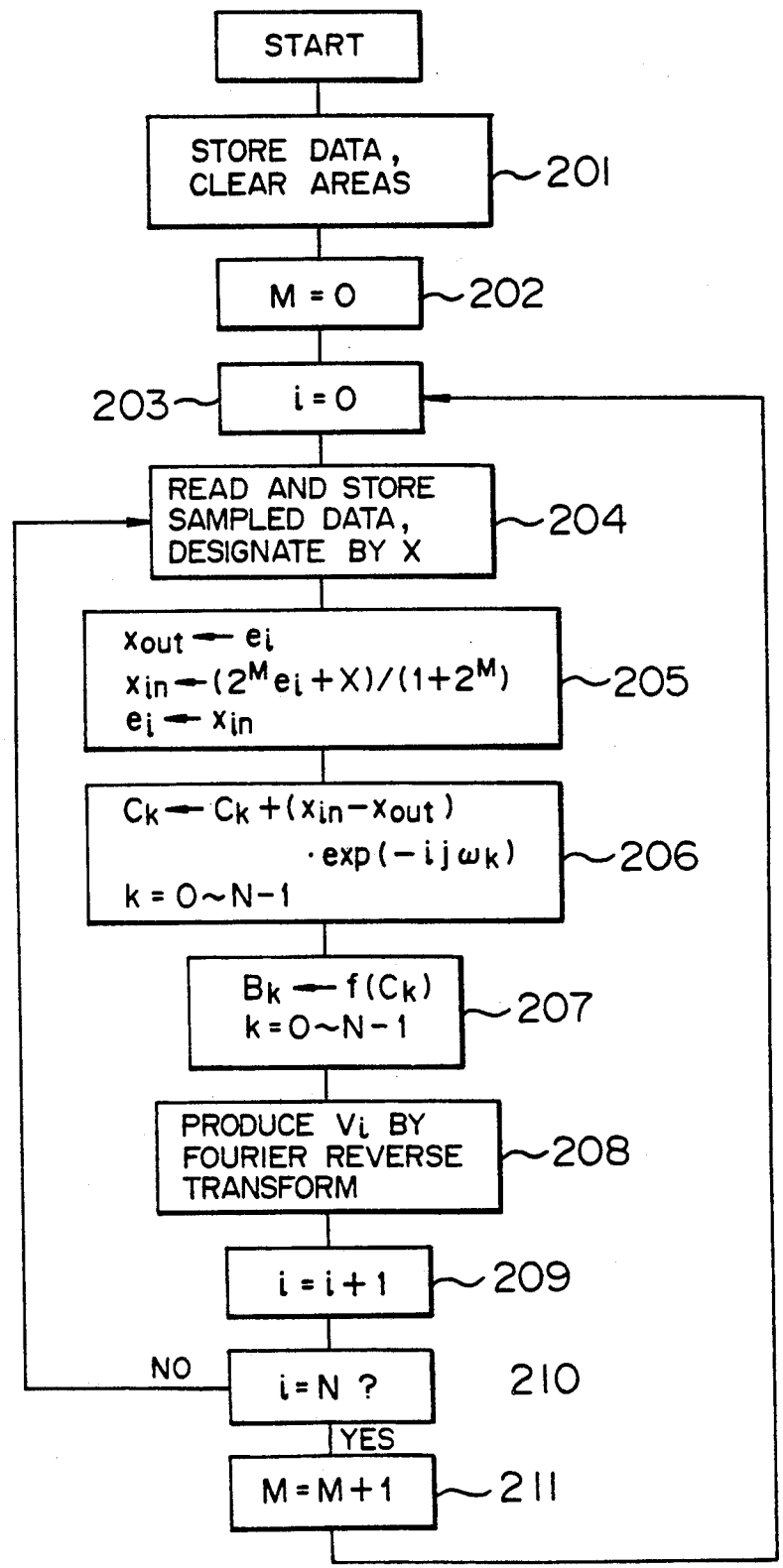
FIG. 6 is a flowchart for the operation of the control apparatus shown in FIG. 5.

FIG. 6 is a flowchart for the processing after the circuit 6. The average processing circuit 6 includes N data storing areas for storing average values $e_0 \sim e_{N-1}$ which will be described later, associated with the N sampled values, 2N data storing areas (N storing areas for each of the real part and the imaginary part) for storing complex amplitude values $C_0 \sim C_{N-1}$ of the calculated result, and 2N data storing areas (N storing areas for each of the real part and the imaginary part) for storing complex amplitude values $B_0 \sim B_{N-1}$ the processed result. Upon start of operation, at step 201, the above data storing areas are all cleared, and then at step 202 parameters M for average processing are set to 0. At step 203, another parameter i is set to zero and at step 204 one sampled data is stored and designated as X. At step 205 the value determined as the average value $e_i$ is substituted into $x_{out}$, and a new average value is obtained using the input X from the following equation:

$$x_{in} = (2^M e_i + X)/(1 + 2^M) \tag{4}$$

and this average value is substituted into $e_i$. These operations are performed by the average processing circuit 6 shown in FIG. 5. The meaning of the operations will be described with reference to FIG. 7.

Figure 7:
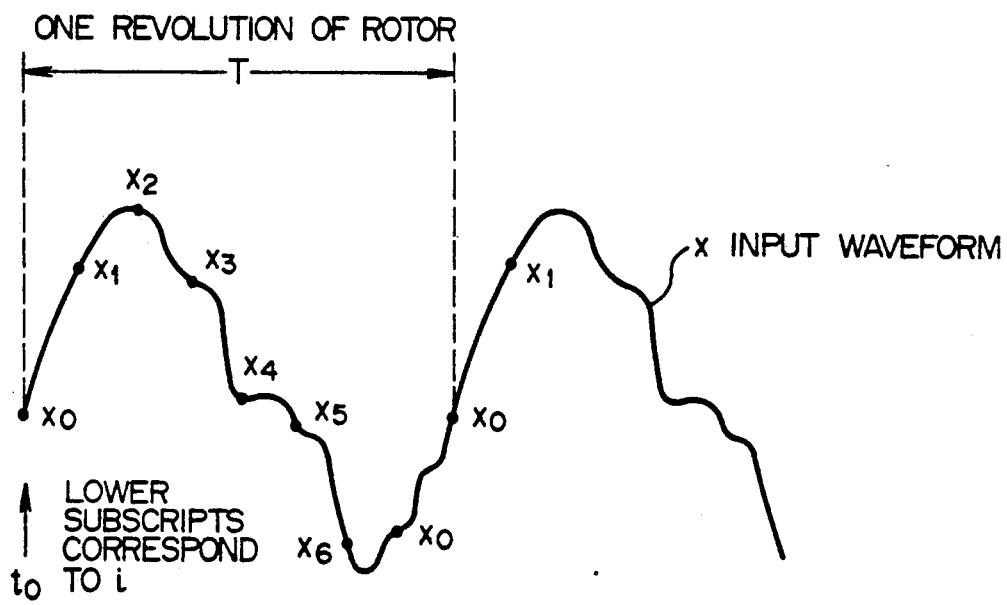
FIG. 7 is a diagram useful for explaining the average processing shown in FIG. 6.

It is assumed that as shown in FIG. 7 sampled values $x_0^0 \sim x_7^0$ are obtained by 8 pulses from the input waveform x during the time T corresponding to one revolution of the rotor from time point $t_0$. The lower subscripts 0 to 7 of the sampled values correspond to i (step 203) in FIG. 6. The value $x_{in}$ obtained from the equation (4) at step 205 is stored as $e_0$ to $e_7$ in this order in the average storing areas. At the next revolution of the rotor, the same processing is performed for the sampled values of $x_0^1, x_0^2 \ldots$ Therefore, at each revolution of the rotor, a new average value $e_0$ can be obtained from the equation (4) by using the average value of the sampled value at the first rotation pulse and the sampled value at the first previous rotation pulse. Similarly, for the second and the following pulses, $e_1, e_2 \ldots$ are updated. Thus, the values $e_0 \sim e_7$ at step 205 in FIG. 6 are the average values of the vibration waveforms at every revolutions of the rotor. Only the vibration components synchronized with the rotation frequency of the rotor can be derived by this processing.

At next step 206 in FIG. 6, the Fourier transform circuit 7 shown in FIG. 5 executes that processing. In other words, the complex amplitude $C_k$ is updated by substituting the values of $x_{in}$ and $x_{out}$ obtained at step 205 and the previously obtained complex amplitude $C_k$ into the following equation called the continuous real time FFT:

$$C_k + C_k + N^{-1}(x_{in} - x_{out})\exp(-ij\omega_k), \quad k=0\text{-}7 \tag{5}$$

where $\omega_k$ is the value shown at equation (2), and the equation (5) is given in Japanese Patent Laid-open Gazette No. 2-244205. The Fourier transform processing can be fast executed by this algorithm.

At step 207, the signal processing circuit 8 makes the processing based on the control of the complex amplitude $C_k$, thus calculating the complex amplitude $B_k$. For example, in order to obtain the Fourier transform of the signal indicating the speed from the vibration displacement waveform x, the following equation is used:

$$B_k = j\omega_k C_k, \quad k=0-N-1 \tag{6}$$

In addition, if the $B_k$ is given by $$B_k = jC_k, \quad k=0\text{-}7 \tag{7}$$

the complex amplitude value 90 degrees ahead can be obtained without changing the gain. In either case, the complex amplitude value $B_k$ of the control signal is obtained in accordance with the object. This processing can be written as the following equation (8) using a certain constant $\alpha_k$ as generally shown by the equations (6) and (7):

$$B_k = \alpha_k C_k, \quad k=0-N-1 \tag{8}$$

At step 208, the Fourier reverse transform circuit 9 shown in FIG. 5 executes that processing, or makes Fourier reverse transform from $B_k$ and calculates the sampled values $v_i$ of time region from the following equation:

$$v_1 = \sum_{k=0}^{N-1} N^{-1} B_k \exp(ij\omega_k)$$

After the end of the above processing, at step 209, i is incremented by 1, and then the processing after step 204 is repeated. When i=N indicating that the rotor has made one full revolution, M is incremented by 1. Then, the program returns to step 203, and the processing for the next revolution is started. The parameter M thus indicates the number of revolutions so far made.

As described above, the vibration components corresponding to the rotation frequency of the rotor and the harmonics are taken out by average processing, converted into a frequency region and then processed back to a time region for the control of the magnetic bearing. Thus, particularly only the vibration at the frequency (the rotation frequency of the rotor) at which the vibration is great, and at the harmonics can be suppressed. The frequencies at which no vibration occurs are not suppressed. Accordingly, it is possible to make the control with less energy loss, or with high efficiency.

Moreover, as shown in FIG. 5, the value, $\Delta x_i$ is obtained by subtracting the average value $e_i$ from the sampled value $x_i$ and the PID processing (10) is made. This value $\Delta x_i$ corresponds to the fluctuation other than the components synchronized with the rotation frequency of the rotor. Therefore, if the magnetic bearing is controlled by the signal after the PID processing (proportion, integration, differentiation), since the harmonics are already removed from the value $\Delta x_i$ the PID processing is easy and the control for suppressing the fluctuation can be accurately performed.

We claim:

1. A magnetic bearing control method comprising the steps of:
    sampling a vibration waveform at pulses which are synchronized with the rotation of a rotor;
    averaging vibration waveform values at each revolution;
    extracting only the frequency components synchronized with the rotation frequency of said rotor from said vibration waveform;
    subjecting the extracted components to Fourier transform;
    processing said Fourier-transformed components in a frequency region;
    subjecting said processed components to Fourier reverse transform; and
    controlling a magnetic bearing by a signal obtained by a sequence of said signal processes given above so that vibration components can be suppressed.

2. A magnetic bearing control method comprising the steps of:
    generating N sampling pulses of first to N-th pulse (N is an integer) at each revolution of a rotor on a magnetic bearing;
    detecting deviations of a rotating shaft of said rotor from predetermined positions in two directions within a plane perpendicular to said shaft;
    sampling said detected deviations in two directions by said first to N th sampling pulses to produce first to N th sampled values;
    averaging i-th sampled values obtained after start of operation so as to produce an i-th average value each time said i-th sampled values ($i = 1 - N$) in two directions are produced;
    obtaining i-th average values up to that time point from said i-th average value;
    obtaining complex amplitude values by discrete Fourier transform of said first to N th average values in two directions, and calculating a control signal by discrete Fourier reverse transform of said complex amplitude values after signal processing of a control law suitable for vibration control; and
    controlling said shaft of said rotor on said magnetic bearing by said control signal.

3. A magnetic bearing control apparatus comprising:
    pulse generating means for generating N sampling pulses of first to N-th sampling pulses (N is an integer) at each revolution of a rotor on a magnetic bearing;
    detection means for detecting deviations of a rotating shaft of said rotor from predetermined positions in two directions within a plane perpendicular to said shaft;
    sampling means for producing first to N-th sampled values by sampling said detected deviations from two directions at said first to N-th sampling pulses;
    averaging means for obtaining i-th average values from i-th average value of i-th sampled values produced after start of operation up to that time point each time said i-th sampled values ($i = 1 \sim N$) in two directions are produced from said sampling means;
    signal processing means for obtaining complex amplitude values by discrete Fourier transform of said first to N-th average values in two directions obtained by said averaging means and for calculating a control signal by discrete Fourier reverse transform of said complex amplitude values after signal processing of a control law suitable for vibration control; and
    control means for controlling said rotating shaft of said rotor on said magnetic bearing by said control signal.

4. A magnetic bearing control apparatus according to claim 3, wherein said i-th average value calculated at that time is subtracted from said i-th sampled values ($i = 1 \sim N$) in two directions, and the remainders of said subtraction are processed by predetermined control elements to produce a signal, which is supplied to the output of said signal processing means, thereby controlling said magnetic bearing.

5. A magnetic bearing control apparatus according to claim 3, wherein the Fourier transform processing in said signal processing means is made by use of said i th sampled value when said i th sampled value ($i = 1 \sim N$) is inputted, said i th average value obtained N sampling pulses before that time point, and said complex amplitude value obtained one sampling pulse before that time point.

6. A magnetic bearing control apparatus according to claim 4, wherein the Fourier transform processing in said signal processing means is made by use of said i th sampled value when said i th sampled value ($i = 1 \sim N$) is inputted, said i th average value obtained N sampling pulses before that time point, and said complex amplitude value obtained one sampling pulse before that time point.

7. A magnetic bearing control apparatus according to claim 3, wherein said pulse generating means is formed of rotation detecting means for producing a pulse at each revolution of said rotating shaft, and a pulse generator for generating N pulses at equal intervals in response to said pulse from said rotation detecting means.

8. A magnetic bearing control apparatus according to claim 4, wherein said pulse generating means is formed of rotation detecting means for producing a pulse at each revolution of said rotating shaft, and a pulse generator for generating N pulses at equal intervals in response to said pulse from said rotation detecting means.

9. A magnetic bearing control apparatus according to claim 3, wherein said pulse generating means is an encoder for generating N pulses at each revolution of said rotating shaft.

10. A magnetic bearing control apparatus according to claim 4, wherein said pulse generating means is an encoder for generating N pulses at each revolution of said rotating shaft.

* * * * *